United States Patent
Yamazaki

(10) Patent No.: US 12,523,816 B2
(45) Date of Patent: Jan. 13, 2026

(54) ATHERMAL ARRAYED WAVEGUIDE GRATING

(71) Applicant: MACOM Technology Solutions Holdings, Inc., Lowell, MA (US)

(72) Inventor: Hiroyuki Yamazaki, Allentown, PA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 246 days.

(21) Appl. No.: 18/471,267

(22) Filed: Sep. 20, 2023

(65) Prior Publication Data

US 2025/0093579 A1    Mar. 20, 2025

(51) Int. Cl.
*G02B 6/12* (2006.01)

(52) U.S. Cl.
CPC ...... *G02B 6/12028* (2013.01); *G02B 6/12011* (2013.01); *G02B 6/12026* (2013.01)

(58) Field of Classification Search
CPC ............... G02B 6/12026; G02B 6/12028
See application file for complete search history.

(56) References Cited

U.S. PATENT DOCUMENTS

| | | | | |
|---|---|---|---|---|
| 6,212,323 | B1* | 4/2001 | Harpin | G02B 6/125 385/39 |
| 2019/0018196 | A1* | 1/2019 | Trita | G02B 6/29355 |
| 2019/0331853 | A1* | 10/2019 | Trita | G02B 6/12033 |

OTHER PUBLICATIONS

T. Hiraki et al. Small sensitivity to temperature variations of Si-photonic Mach-Zehnder interferometer using Si and SiN waveguides. Frontiers in Materials, vol. 2, Article 26, Mar. 2015 (https://doi.org/10.3389/fmats.2015.00026) (Year: 2015).*

A. Trita et al. CMOS compatible athermal silicon photonic filters based on hydrogenated amorphous silicon. Optics Express, vol. 30, No. 11, May 23, 2022 (https://doi.org/10.1364/OE.446998) (Year: 2022).*

* cited by examiner

*Primary Examiner* — Michael Stahl
(74) *Attorney, Agent, or Firm* — Jeffery J Brosemer

(57) ABSTRACT

Athermal arrayed waveguide grating structure that may operate as an optical filter including an input Silicon (Si) slab waveguide, an output Si slab waveguide, the input Si slab waveguide and the output Si slab waveguide optically connected by an arrayed group of Silicon Nitride (SiN) grating waveguides. Temperature insensitivity of the structure is achieved by locating output waveguide(s) of the Si output slab waveguide at/within a 10-degree angle offset from the center line of the output Si slab waveguide.

12 Claims, 7 Drawing Sheets

ATHERMAL ARRAYED WAVEGUIDE GRATING

FIELD OF THE INVENTION

This application relates generally to optical devices, such as wavelength routers and optical multiplexers, used in light-based telecommunications and computer networks.

BACKGROUND OF THE INVENTION

The demand for greater communication data rates implies a constant need or newer and better technologies to support that demand. One such technology area is fiber-optic communications, in which data is transmitted as light energy over optical fibers. To increase data rates, more than one data channel can be conveyed by a single fiber link. For example, in wavelength division multiplexing (WDM), different channels are differentiated by wavelength or color. Such techniques require special components to combine and/or separate the different channels for transmission, switching, and/or receiving.

A wavelength router (also known as a wavelength grating router (WGR), an arrayed waveguide grating (AWG), or a phased array) is an optical device that can be used to combine and/or separate light energy of different wavelengths. A wavelength router selectively routes light of a particular wavelength from an input port to an output port. When used to route light of different wavelengths from more than one input port and/or to more than one output port, a wavelength router can be used to operate as an optical multiplexer and/or demultiplexer that combines and/or separates light energy of different wavelengths.

FIG. 1 shows a schematic diagram of a conventional, prior art wavelength router 100 implemented as an integrated device formed on a suitable substrate 102 (e.g., silicon or silica). Router 100 has a plurality of Si input waveguides 106 adapted to receive light from one or more input ports 104. Router 100 also has a plurality of Si output waveguides 114 adapted to transmit light to one or more output ports 116. While not specifically shown in the figure, Si input waveguides 106 may be optically connected to the input ports 104 by one or more incoming optical fibers or other on-chip, optical waveguide structures (not specifically shown in the figure). Similarly, Si output waveguides 114 may be optically connected to the output ports 116 by one or more outgoing optical fibers or other on-chip, optical waveguide structures (not specifically shown in the figure).

Between the Si waveguide input and output ports are two Si free space couplers 108 and 112 (also known in the art as "star couplers", "free space slab waveguides", or simply, "free space") separated and optically connected by a set of M Si waveguides (1 . . . M) that form the arms 110 of the router.

As illustratively shown in the figure, an index of refraction for the M Si waveguides is indicated as $n_w$, while an index of refraction for the free space couplers is indicated as $n_f$.

In operation, light received at one of the input ports 104 is transmitted along a corresponding Si input waveguide 106 to Si free space coupler 108. Light entering Si free space coupler 108 is radiated for receipt by—and transmission along—each of the Si router arms 110 toward Si free space coupler 112. Light entering Si free space coupler 112 is radiated towards the Si output waveguides 114, where it is transmitted to output ports 116.

Wavelength router 100 is preferably designed such that all the optical distances from a particular location at the input side of Si free space coupler 108 (i.e., where one particular of the waveguides 106 meets Si free space coupler 108) along each Si router arm 110 to a particular location on the output side of Si free space coupler 112 (i.e., where one particular of the Si output waveguides 114 meets Si free space coupler 112) differ by an integer multiple of a particular wavelength for the different Si router arms. As such, light of that particular wavelength entering Si free space 108 from that particular Si input waveguide 106 will be focused on the output side of the Si free space coupler 112 at that particular output waveguide 114. That is, light of that particular wavelength will constructively interfere (i.e., add in phase) at that particular Si output waveguide location, and substantially destructively interfere at all other Si output waveguide locations. Moreover, light of most other wavelengths will not, in general, be focused (i.e., will effectively destructively interfere) at that particular Si output waveguide location. As such, wavelength router 100, can be used as an optical passband filter.

Furthermore, to the extent that wavelength router 100 can be designed to focus light having different wavelengths at different Si output waveguide locations on the output side of Si free space coupler 112, wavelength router 100 can operate as a one-to-many optical multiplexer that can receive light of different wavelengths from a single incoming optical fiber and selectively transmit those different frequencies to different output ports for propagation along different outgoing optical fibers. Similarly, wavelength router 100 can be further designed to operate as a many-to-one optical demultiplexer that receives different wavelength light from incoming optical fibers for transmission to a single outgoing optical fiber, or as a many-to-many optical multiplexer that receives different wavelength light from different incoming optical fibers for transmission to different outgoing optical fibers. Moreover, wavelength router 100 may be a symmetric optical device that can be operated in either direction (i.e., either from the left to right or from right to left in FIG. 1). Typically, and as illustratively shown in the figure, such wavelength routers are realized using silica waveguides deposited on a thick substrate of quartz or silicon.

Since optical communications systems are typically deployed in the real world, they must operate effectively over a relatively wide range of temperatures. As such, it is desirable to design optical devices such as wavelength routers whose operating characteristics do not change significantly over that temperature range. Due to thermal expansion and index changes, changes in temperature can result in changes in the optical path lengths of the router arms. This can adversely affect the ability of a wavelength router to operate effectively as temperature changes. Previous attempts to design athermal wavelength routers, that is routers that are relatively independent to temperature fluctuations, have ultimately proven unsatisfactory. Consequently, the temperatures of wavelength routers are oftentimes controlled by expensive heaters that may require several watts of electrical power to operate. Such power requirement limits the use of wavelength routers in outside plant (non-central office) locations and in remote locales, such as undersea.

SUMMARY OF THE INVENTION

The above problem is solved and an advance in the art is made according to aspects of the present disclosure directed to optical devices, such as wavelength routers, that exhibit improved independence to temperature fluctuations. In sharp contrast to the prior art, optical devices according to the present disclosure achieve temperature independence by constructing the input and output waveguide free space couplers from Silicon (Si) and constructing arrayed waveguide arms from Silicon Nitride (SiN). Temperature insensitivity of the structure is further improved by locating output waveguides of Si output waveguide free space coupler at/within a 10 degree angle offset from the center line of the Si output waveguide free space coupler.

DETAILED DESCRIPTION OF THE INVENTION

Figure 1:
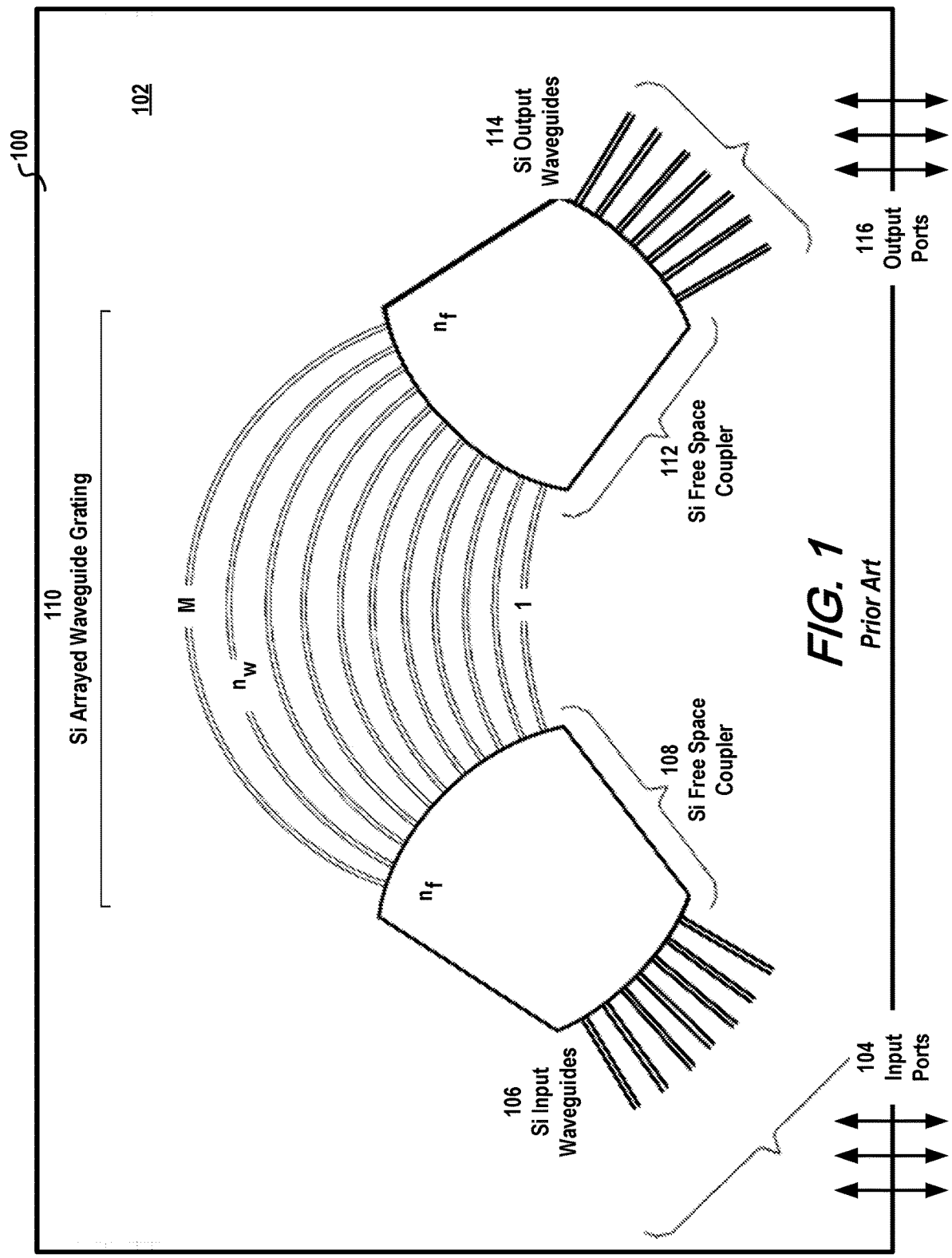
FIG. 1 shows a schematic diagram of an illustrative prior art wavelength router.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

Figure 2:
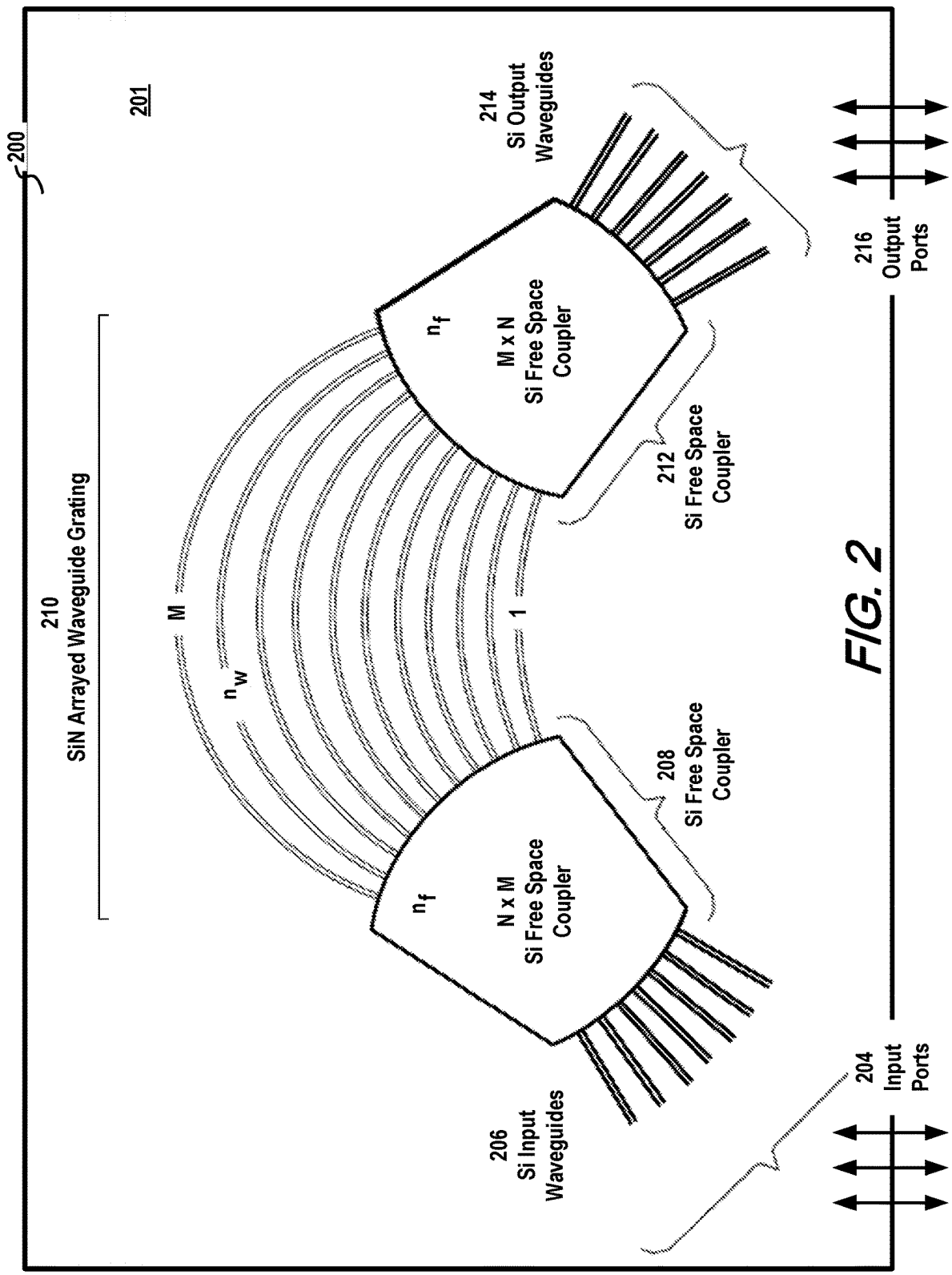
FIG. 2. shows a schematic diagram of an illustrative wavelength router according to aspects of the present disclosure.

FIG. 2. shows a schematic diagram of an illustrative N×N wavelength router 200 according to aspects of the present disclosure. Wavelength router 200 is implemented as an integrated device formed on a suitable substrate 201. Router 200 has a plurality (N) of equally spaced apart from one another Si input waveguides 206 adapted to receive light from one or more incoming input ports 204. Router 200 also has a plurality (N) of equally spaced apart from one another Si output waveguides 214 adapted to transmit light to one or more output ports 216. While not specifically shown in the figure, Si input waveguides 206 may be optically connected to the input ports 204 by one or more incoming optical fibers or other on-chip, optical waveguide structures (not specifically shown in the figure). Similarly, Si output waveguides 214 may be optically connected to the output ports 216 by one or more outgoing optical fibers or other on-chip, optical waveguide structures (not specifically shown in the figure).

Between the Si waveguide input and output ports are two Si free space couplers 208 and 212 separated and optically connected by a set of M Silicon Nitride (SiN) waveguides (1 . . . M) that form the arms 210 of the router.

As illustratively shown in the figure, an index of refraction for the M SiN waveguides is indicated as $n_w$, while an index of refraction for the free space couplers is indicated as $n_f$.

During operation, light received at one of the input ports 204 is transmitted along a corresponding Si input waveguide 206 to Si free space coupler 208. Light entering Si free space coupler 208 is radiated for receipt by—and transmission along—each of the SiN router arms 210 toward Si free space coupler 212. Light entering Si free space coupler 212 is radiated towards the Si output waveguides 214, where it is transmitted to output ports 216.

As previously noted, router 200 surprisingly achieves temperature independence by employing input and output Si waveguide free space couplers constructed from Silicon (Si) employing SiN arrayed waveguide arms constructed from Silicon Nitride (SiN).

Figure 3:
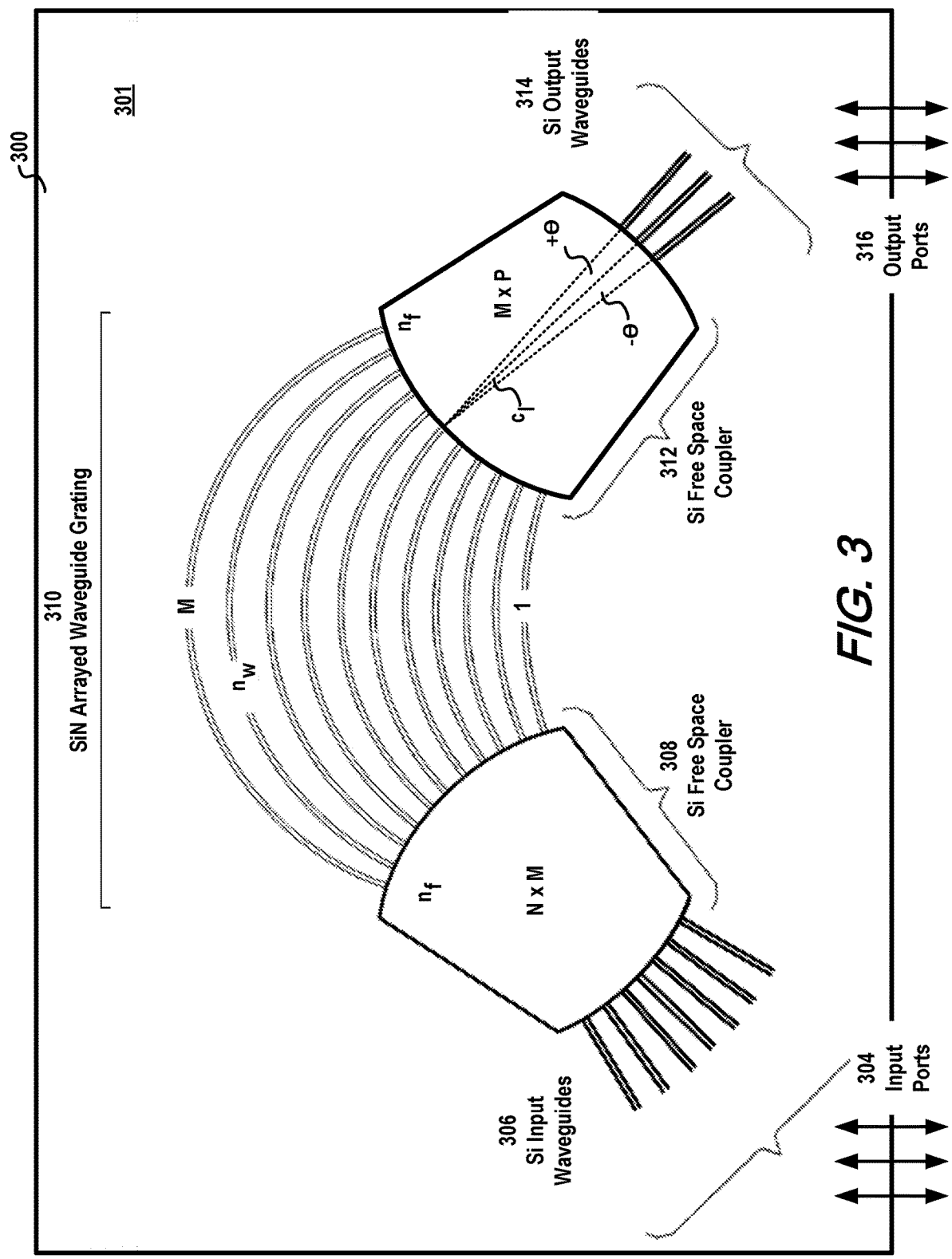
FIG. 3. shows a schematic diagram of an illustrative wavelength router according to further aspects of the present disclosure.

FIG. 3 shows a schematic diagram of an illustrative N×P wavelength router 300 according to aspects of the present disclosure. Wavelength router 300 is implemented as an integrated device formed on a suitable substrate 301. Router 300 has a plurality (N) of equally spaced Si input waveguides 306 adapted to receive light from one or more incoming input ports 304. Router 300 also has a plurality (P) of equally spaced Si output waveguides 314 adapted to transmit light to one or more output ports 316. While not specifically shown in the figure, Si input waveguides 306 may be optically connected to the input ports 304 by one or more incoming optical fibers or other on-chip, optical waveguide structures (not specifically shown in the figure). Similarly, Si output waveguides 314 may be optically connected to the output ports 316 by one or more outgoing optical fibers or other on-chip, optical waveguide structures (not specifically shown in the figure).

Between the Si waveguide input and output ports are two Si free space couplers 308 and 312 separated and optically connected by a set of M Silicon Nitride (SiN) waveguides (1 . . . M) that form the arms 310 of the router.

As illustratively shown in the figure, an index of refraction for the M SiN waveguides is indicated as $n_w$, while an index of refraction for the free space couplers is indicated as $n_f$.

During operation, light received at one of the input ports 304 is transmitted along a corresponding Si input waveguide 306 to Si free space coupler 308. Light entering Si free space coupler 308 is radiated for receipt by—and transmission along—each of the SiN router arms 310 toward Si free space coupler 312. Light entering Si free space coupler 312 is radiated towards the Si output waveguides 314, where it is transmitted to output ports 316.

As previously noted, router 200 surprisingly achieves temperature independence by employing input and output Si waveguide free space couplers constructed from Silicon (Si) employing SiN arrayed waveguide arms constructed from Silicon Nitride (SiN).

Shown further in FIG. 3 is preferred geometric arrangement of Si output waveguides 314 with respect to Si free space coupler 312. As illustratively shown in the figure, a central line $c_l$ is illustrated as originating at a slab input center of the Si free space coupler 312 and ending at a slab output center of the Si free space coupler 312. Shown further in the figure are two offset angles +Θ and −Θ that define an output area of the Si free space coupler 312 in which Si output waveguides 314 are preferably located. As illustrated in the figure, a single one of the three output Si output waveguides 314 is positioned at the slab output center while the two adjacent ones are offset by an amount defined by angles +Θ and −Θ. I have determined that preferred value(s) for angles +Θ and −Θ are +10 degrees and −10 degrees respectively, from the slab centerline. Accordingly, in a preferred embodiment of athermal AWGs according to the present disclosure will include one or more output waveguides (corresponding to Si output waveguides 314) that are offset from the centerline of the slab Si free space coupler 312 by no more than 10 degrees.

Figure 4:
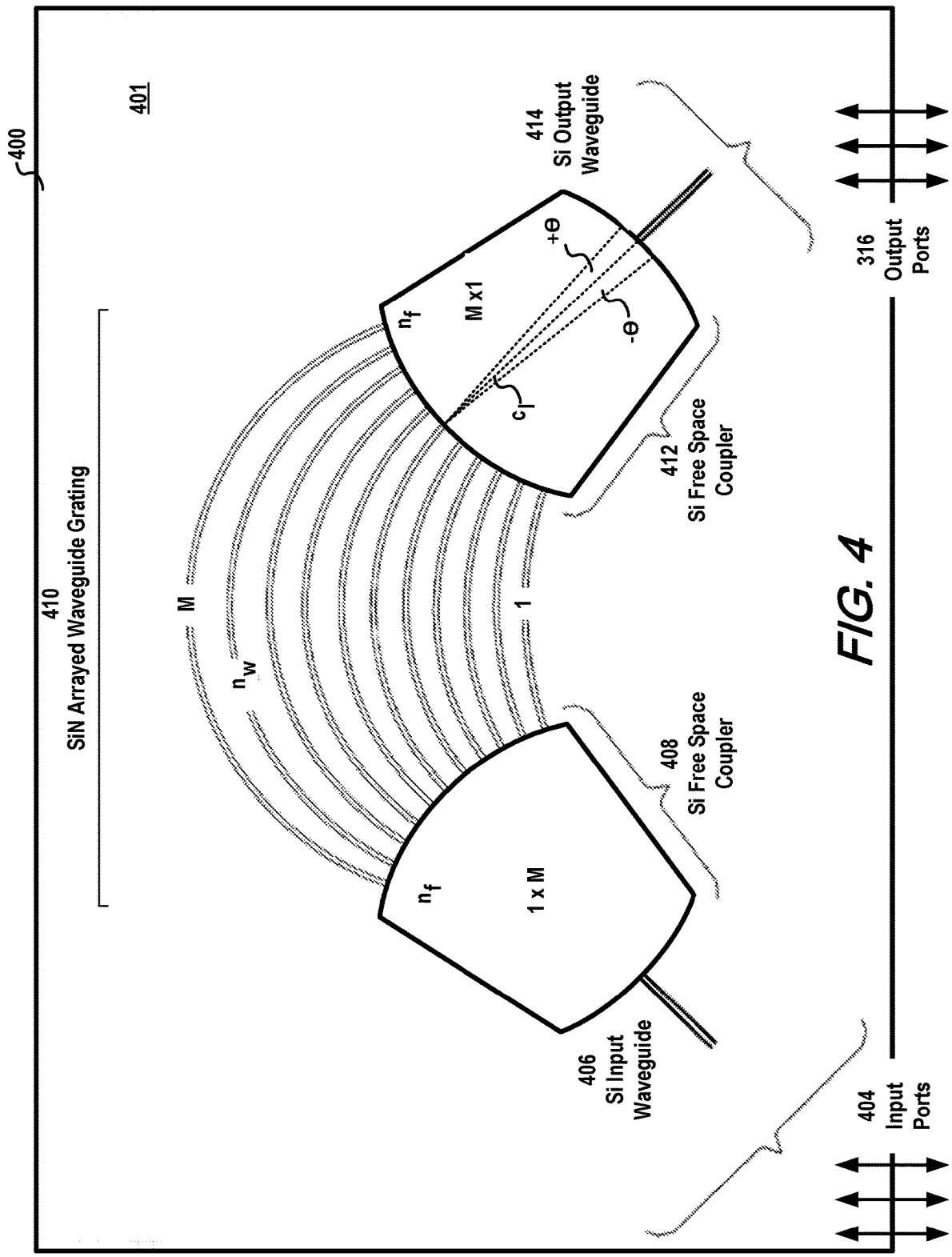
FIG. 4. shows a schematic diagram of an illustrative wavelength router according to further aspects of the present disclosure.

FIG. 4 shows a schematic diagram of an illustrative 1×1 wavelength router 400 according to aspects of the present disclosure. Wavelength router 400 is implemented as an integrated device formed on a suitable substrate 401 and has one or more Si input waveguides 406 adapted to receive light from one or more incoming input ports 404. Router 400 also has one or more Si output waveguides 414 adapted to transmit light to one or more output ports 416. While not specifically shown in the figure, Si input waveguide 406 may be optically connected to the input ports 404 by one or more incoming optical fibers or other on-chip, optical waveguide structures (not specifically shown in the figure). Similarly, Si output waveguide 414 may be optically connected to the output ports 416 by one or more outgoing optical fibers or other on-chip, optical waveguide structures (not specifically shown in the figure).

Between the Si waveguide input and output ports are two Si free space couplers 408 and 412 separated and optically connected by a set of M Silicon Nitride (SiN) waveguides (1 . . . M) that form the arms 410 of the router.

As illustratively shown in the figure, an index of refraction for the M SiN waveguides is indicated as $n_w$, while an index of refraction for the free space couplers is indicated as $n_f$.

During operation, light received at the input port 404 is transmitted along a corresponding Si input waveguide 406 to Si free space coupler 408. Light entering Si free space coupler 408 is radiated for receipt by—and transmission along—each of the SiN router arms 410 toward Si free space coupler 412. Light entering Si free space coupler 412 is radiated towards the Si output waveguide 414, where it is transmitted to output ports 416.

As have previously noted, router 400 achieves temperature independence by employing input and output Si waveguide free space couplers constructed from Silicon (Si) employing SiN arrayed waveguide arms constructed from Silicon Nitride (SiN). Shown further in FIG. 4 is preferred geometric arrangement of Si output waveguide 414 with respect to Si free space coupler 412. As illustratively shown in the figure, the Si output waveguide(s) 414 are located within 10 degrees of a central line c of the output Si free space coupler 412 as illustratively shown.

Figure 5:
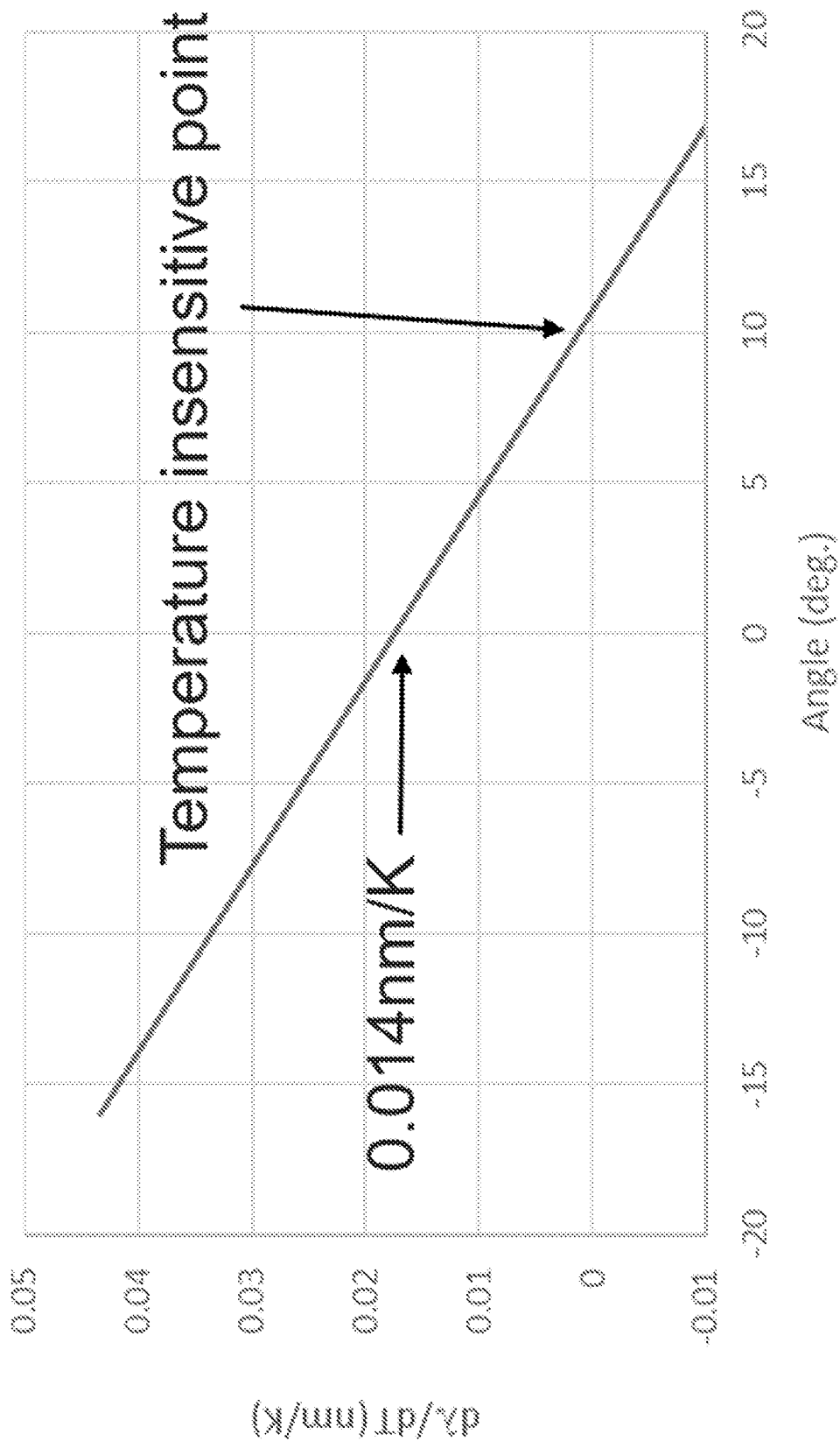
FIG. 5 shows a plot of dλ vs. angle illustrating a temperature insensitive point of approximately ±10 degrees for output Si free space coupler structures according to aspects of the present disclosure.

FIG. 5 shows a plot of dλ vs. angle illustrating a temperature insensitive point of approximately ±10 degrees for output Si free space coupler structures according to aspects of the present disclosure.

Figure 6:
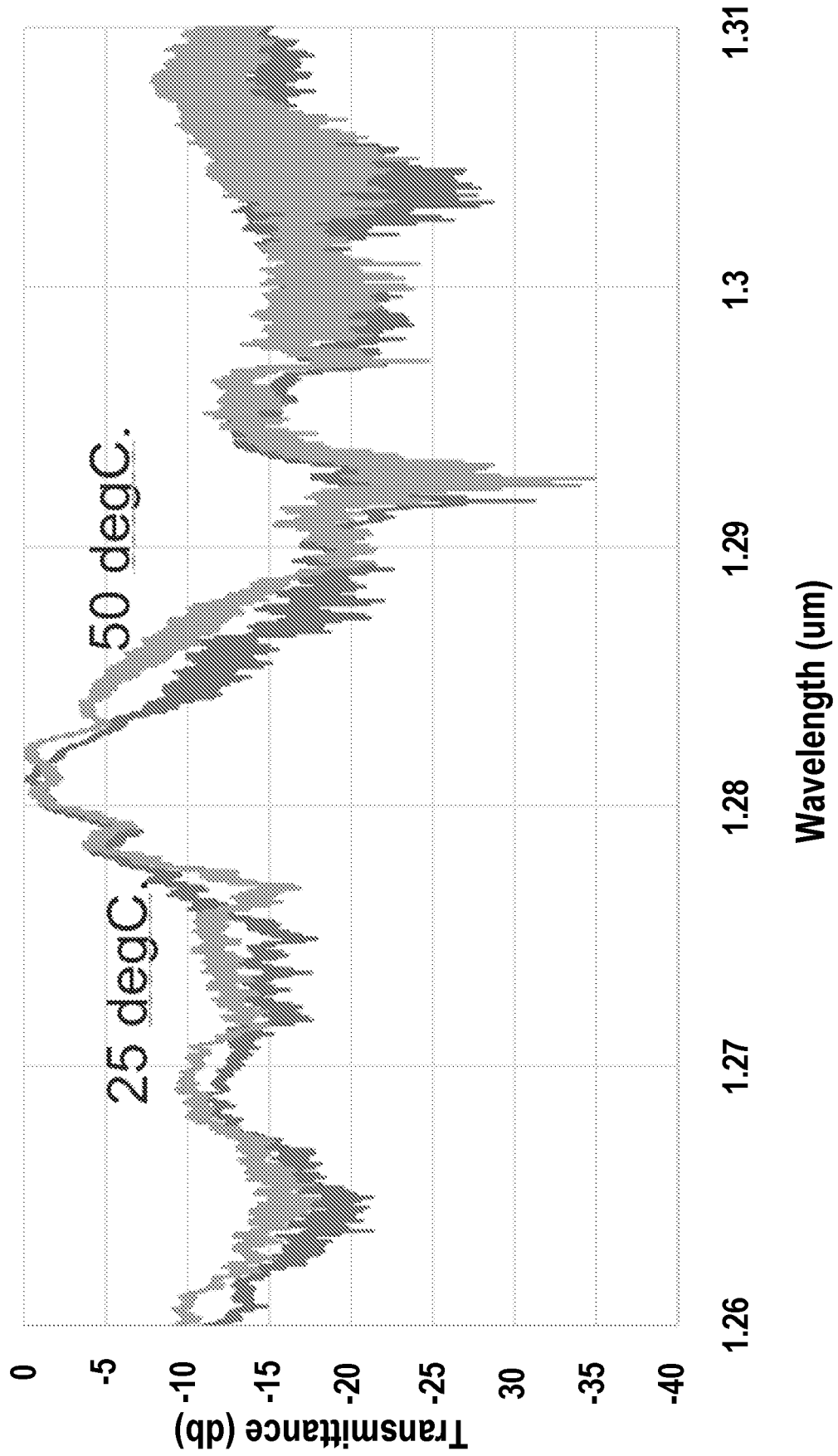
FIG. 6 shows a plot of Transmittance vs. wavelength illustrating temperature insensitivity of SiN athermal structures according to aspects of the present disclosure.

FIG. 6 shows a plot of Transmittance vs. wavelength illustrating temperature insensitivity of SiN athermal structures according to aspects of the present disclosure.

Figure 7:
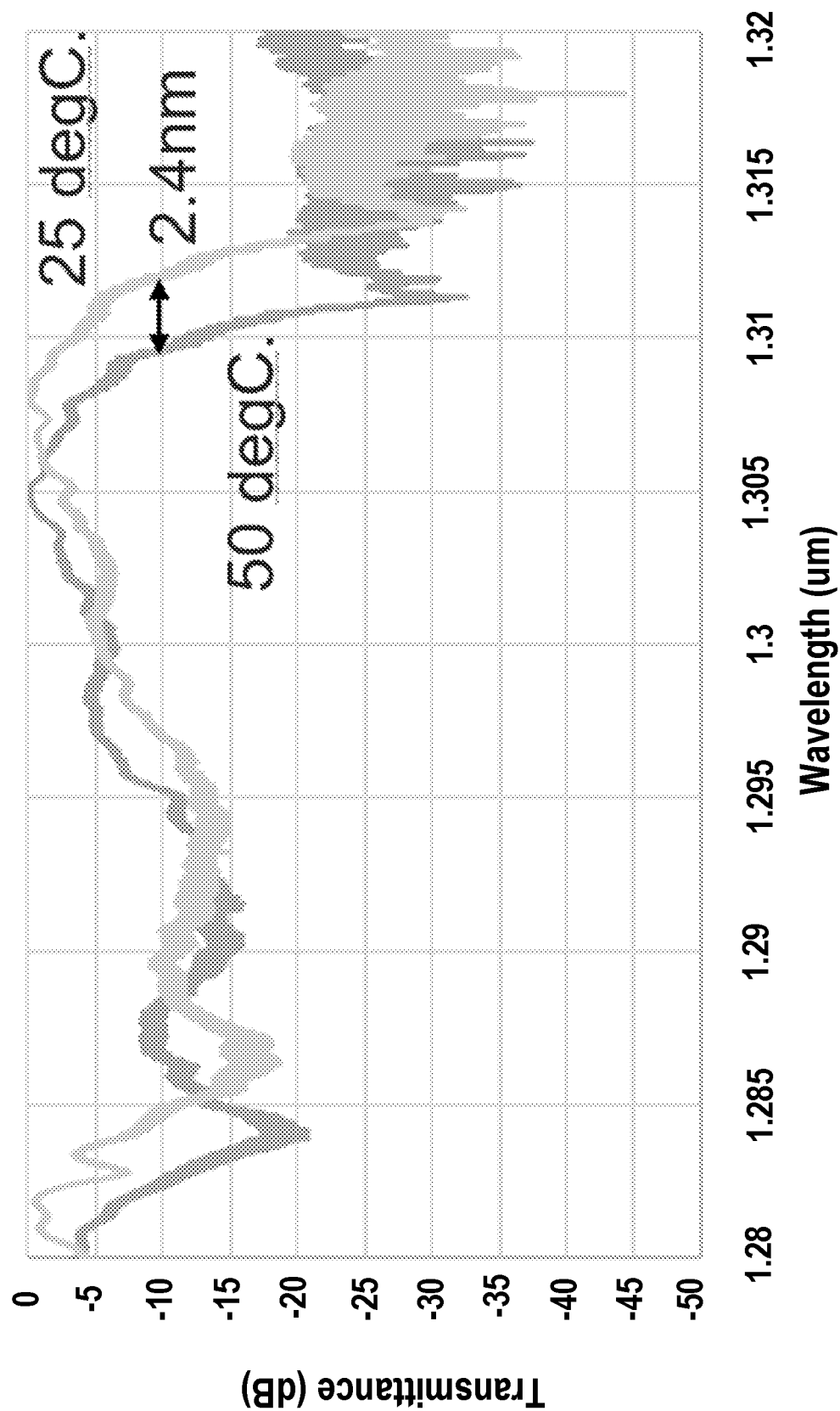
FIG. 7 shows a plot of Transmittance vs. wavelength illustrating temperature sensitivity aspect of Si structures according to aspects of the present disclosure.

FIG. 7 shows a plot of Transmittance vs. wavelength illustrating temperature sensitivity aspect of Si structures according to aspects of the present disclosure.

At this point, while I have presented this disclosure using some specific examples, those skilled in the art will recognize that our teachings are not so limited. Accordingly, this disclosure should only be limited by the scope of the claims attached hereto

The invention claimed is:

1. An athermal arrayed waveguide grating structure comprising:
    an input free space coupler;
    an output free space coupler; and
    a waveguide array of M waveguides of unequal length optically connecting the input free space coupler to the output free space coupler, wherein each waveguide in the waveguide array extends from the input free space coupler to the output free space coupler;
    wherein the input and the output free space couplers are constructed from Silicon (Si) and the M waveguides of unequal length are constructed from Silicon Nitride (SiN).

2. The athermal arrayed waveguide structure of claim 1 further comprising:
    one or more input waveguides optically connected to the input free space coupler at a side of the input free space coupler opposite to a side of the input free space coupler to which the M waveguides of unequal length are attached;
    one or more output waveguides optically connected to the output free space coupler at a side of the output free space coupler opposite to a side of the output free space coupler to which the M waveguides of unequal length are attached;
    wherein the one or more input waveguides and the one or more output waveguides are constructed from Silicon (Si).

3. The athermal arrayed waveguide structure of claim 2 wherein the one or more output waveguides are positioned at or within 10 degrees of a centerline of the output free space coupler.

4. The athermal arrayed waveguide structure of claim 3 wherein the one or more input waveguides are equally spaced apart from one another.

5. The athermal arrayed waveguide structure of claim 4 wherein the one or more output waveguides are equally spaced apart from one another.

6. The athermal arrayed waveguide structure of claim 5 integrated on a common substrate.

7. The athermal arrayed waveguide structure of claim 6 further comprising:
    one or more input ports configured to transmit input light to the one or more input waveguides.

8. The athermal arrayed waveguide structure of claim 6 further comprising:
    one or more output ports configured to transmit output light from the one or more output waveguides.

9. The athermal arrayed waveguide structure of claim 8 configured as an optical filter.

10. A waveguide optical filter comprising;
an input slab waveguide;
an output slab waveguide;
a waveguide array optically connecting the input slab waveguide to the output slab waveguide;
CHARACTERIZED IN THAT:
each waveguide in the waveguide array extends from the input slab waveguide to the output slab waveguide; and
the input slab waveguide and the output slab waveguide are Si slab waveguides, and the waveguide array is a SiN waveguide array.

11. The waveguide optical filter of claim 10 FURTHER CHARACTERIZED IN THAT
the input Si slab waveguide is an N×M Si slab waveguide having N input waveguide ports and M output waveguide ports, the output Si slab waveguide is an M×P slab waveguide having M input waveguide ports and P output waveguide ports, and the SiN waveguide array has M waveguides in the waveguide array.

12. The waveguide optical filter of claim 10 FURTHER CHARACTERIZED IN THAT
the P output waveguide ports of the output Si slab waveguide are located at or within 10 degrees of a centerline of the output Si slab waveguide.

* * * * *